United States Patent [19]
Engel

[11] 3,867,639
[45] Feb. 18, 1975

[54] OPTICAL CORRELATOR
[75] Inventor: Andreas Hermann Engel, Baltimore, Md.
[73] Assignee: Turlabor AG, Zumikon, Switzerland
[22] Filed: May 17, 1973
[21] Appl. No.: 361,156

[30] Foreign Application Priority Data
May 19, 1972 Switzerland.......................... 7526/72

[52] U.S. Cl. .............. 250/550, 350/162 SF, 356/71
[51] Int. Cl. ........................................... G01n 21/30
[58] Field of Search .. 250/219 D, 219 QA, 219 CR, 250/219 DF; 350/162 SF, 162 R; 356/71

[56] References Cited
UNITED STATES PATENTS
| | | | |
|---|---|---|---|
| 3,614,232 | 10/1971 | Mathisen | 250/219 DF |
| 3,666,359 | 5/1972 | Lee | 350/162 SF |
| 3,670,305 | 6/1972 | Maloney | 356/71 |
| 3,704,949 | 12/1972 | Thomas | 356/71 |
| 3,746,455 | 7/1973 | Flamholz | 350/162 SF |

Primary Examiner—James W. Lawrence
Assistant Examiner—D. C. Nelms

[57] ABSTRACT

Optical correlator for comparing a test sample with a standard object in which a diffractive image of the sample is projected on a holographic filter by a beam of coherent light. The light beam being diffracted by the filter is subsequently conveyed through an apertured diaphragm into a light-measuring apparatus generating an electrical signal proportionate to the intensity of the received light. An auxiliary filter is positioned either forwardly or rearwardly of the holographic filter, and is either a black-white or phase-reversing filter transmitting either one or both halves, respectively, of each of the diffraction orders generated by the standard object.

6 Claims, 3 Drawing Figures

OPTICAL CORRELATOR

FIELD OF THE INVENTION

The present invention relates to an optical correlator for the comparison of a test sample with a standard object, and more particularly, to an additional filter for enhancing the sensitivity of the device.

DISCUSSION OF THE PRIOR ART

It has been ascertained that comparative valves obtained with known correlators of this type may, under various circumstances, lead to erroneous results, particularly in connection with extremely small test samples.

SUMMARY OF THE INVENTION

An unambiguous, practically linear relationship between the output signal and the size deviation of the test sample with respect to the standard object is obtained, in accordance with the present invention, in that the holographic filter includes, directly forwardly or rearwardly thereof, black-white auxiliary filter or a phase reversing-auxiliary filter, in which the auxiliary filter comprises in a first half thereof the first, second, third et seq. diffractive order of the transmission +1, and in the other half thereof the same diffractive orders of the transmission 1 or 1.

BRIEF DESCRIPTION OF THE DRAWINGS

Reference may now be had to the drawing, in which.

DETAILED DESCRIPTION

Figure 1:
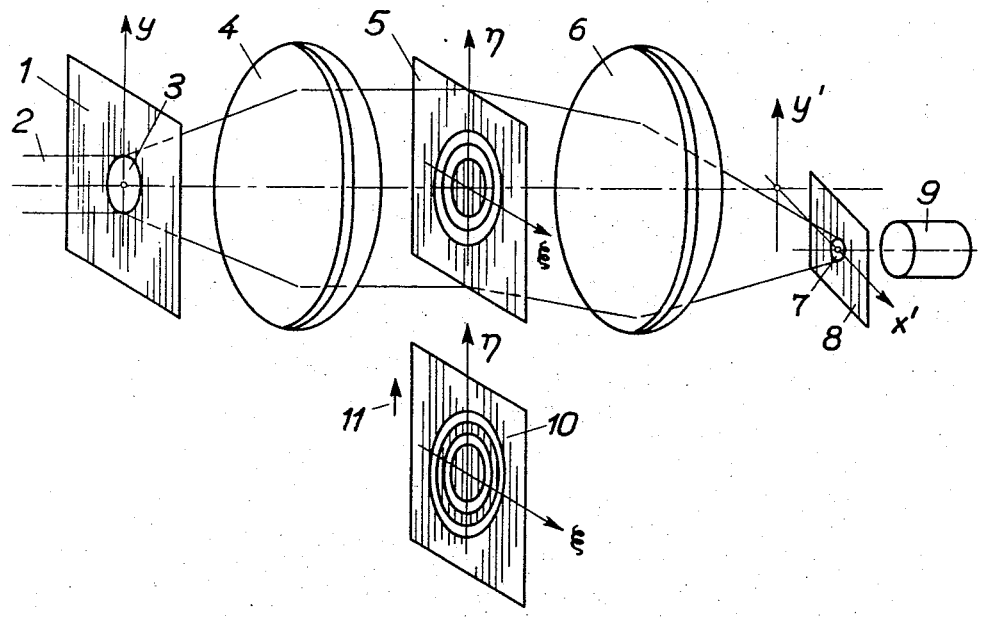
FIG. 1 schematically illustrates an embodiment of an optical correlator according to the invention.

As shown in FIG. 1 of the drawing, a test sample 1 is located in the input plane of the optical correlator, and is illuminated by a monochromatic parallel-light beam 2. The test sample 1 may consist of a circular aperture 3 which is, for example, 10$\mu$m in diameter. The light beam diffracted by the aperture 3, impinges upon a first lens 4, which then projects the diffractive image onto a holographic filter 5. In a known manner, such a filter is generally formed by the illuminating of a photographic plate with the diffractive image of the standard object and an incoming axially tilted parallel-light beam. The light diffracted at the holographic filter is then focused on an aperture 7 of an apertured diaphragm 8 by a means of a second lens 6, and is then received by a light-measuring apparatus 9 adapted to generate an electrical output signal in proportion to the intensity of the light. As above described, this facet of the optical correlator is known, and it has been previously expected that the electrical output signal was at a maximum value when the test sample was in exact conformance with the standard object. However, extensive investigations have indicated that this does not necessarily follow, since as the output signal frequently fails to provide an unambiguous affirmation concerning any deviations of the test sample with respect to the standard object. It may even occur that the output signal is greater when the test sample does not precisely conform with the standard object than when it does correspond therewith, which is due to the finite dimensions of the lenses and, respectively, the holographic filter. The imprecisions become the greater, the smaller the size of the test sample. In order to eliminate this shortcoming, the inventive correlator is provided with an auxiliary filter 10, which is illustrated in FIG. 1 as being located below the holographic filter 5, but in actuality is directly positioned either forwardly or rearwardly thereof; in effect, it is to be presumed that in FIG. 1 the filter 10 is moved upwardly in the direction of arrow 11.

The auxiliary filter 10 provides for either the black-white version displayed in FIG. 2 of the drawing, or the phase reversing version as described with reference to FIG. 3.

Figure 2:
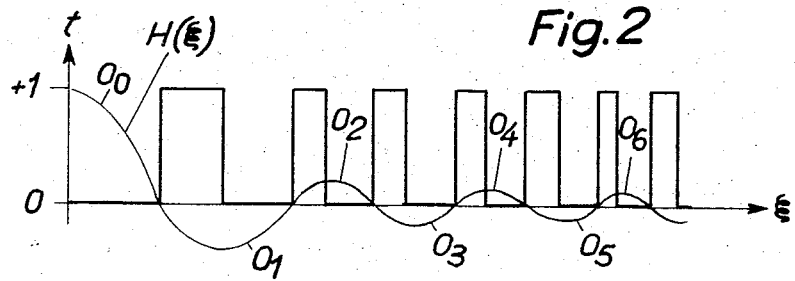
FIGS. 2 and 3, respectively, elucidate the construction of the auxiliary additional filter contained therein.
Figure 3:
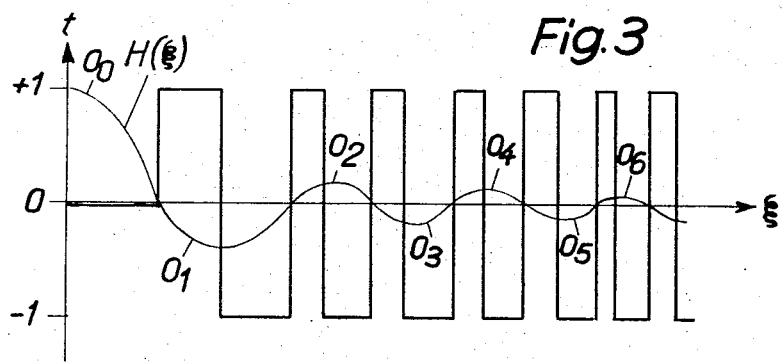

In FIG. 2, the curve H ($\xi$) illustrates the diffractive image of the circular aperture of the standard object in the $\xi$- axis of the $\xi$-$\eta$-plane of filter 5, which is also qualitatively representative for other forms of the aperture. The black-white filter 10 is so constructed that from the O. diffraction order $O_0$ nothing, and from the subsequent diffraction orders $O_1$, $O_2$, $O_3$ . . . and so forth, the left half is permitted to pass therethrough. The phase-reversing filter 10 may also be constructed in accordance with FIG. 3, wherein in the right half of the diffraction order $O_1$, $O_2$, $O_3$ . . . and so forth, the transmission $t$ is not 0, but equals $-1$, which means that a phase reversal of $\pi$ takes place during full transmission.

In both instances the effect is identical and, in actuality, a linear relationship is achieved between the output signal and the deviation of the diameter of aperture 3 of the test sample with respect to the diameter of the standard object. This has been proven theoretically and experimentally. By means of auxiliary filters, the correlator is effectively made into an extremely dependable measuring instrument, in which, predicated on the intensity of the output signal, the crosssectional deviation may directly be determined and, in actuality, when assuming a diameter of, for example, 10 $\mu$m, with a precision of within 1%. This is of extreme advantage, for example, in the sequential testing of bearings, in particular, watch jewels, or spindles.

Instead of providing the left half of the diffraction orders $O_1$, $O_2$, $O_3$ . . . and so forth, with the transmission $t = +1$, the transmission $t = +1$ may be provided for the right half of the diffraction orders $O_0$, $O_1$, $O_2$ . . . and so forth, allowing similarly achieving of the desired linearization, however, with a reversed inclination of the representative line described by the equation of the output signal as a function of the deviation.

The quantity of the diffraction orders which must be considered in regard to the auxiliary filter 10, depends upon the measuring parameters and the required precision.

While there has been shown what is considered to be the preferred embodiment of the invention, it will be obvious that modifications may be made which come within the scope of the disclosure of the specification.

What is claimed is:

1. In an optical correlator having means for producing a beam of coherent light, a test sample positioned in the path of said light beam, a hologram filter including a diffraction image of a standard object to receive a diffraction image of said test sample, light-measuring means for receiving light from said hologram filter and adapted to produce an output signal proportionate to the intensity of the light received, and diaphragm means including an aperture interposed between said hologram filter and said light-measuring means, the light from said hologram filter passing through said aperture in said diaphragm means, the improvement comprising: auxiliary filter means positioned in the path of said light beam proximate said hologram filter, said auxiliary filter means having in one half of the first, second, third et seq. diffraction order of said standard object the transmittance +1 and in the other half of said diffraction orders a transmission 0 for providing a black-white filter.

2. A correlator as claimed in claim 1, said auxiliary filter means being positioned forwardly of said hologram filter.

3. A correlator as claimed in claim 1, said auxiliary filter means being positioned rearwardly of said hologram filter.

4. In an optical correlator having means for producing a beam of coherent light, a test sample positioned in the path of said light beam, a hologram filter including a diffraction image of a standard object to receive a diffraction image of said test sample, light-measuring means for receiving light from said hologram filter and adapted to produce an output signal proportionate to the intensity of the light received, and diaphragm means including an aperture interposed between said hologram filter and said light-measuring means, the light from said hologram filter passing through said aperture in said diaphragm means, the improvement comprising:

auxiliary filter means positioned in the path of said light beam proximate said hologram filter, said auxiliary filter means having in one half of the first, second, third et seq. diffraction order of said standard object the transmittance +1 and in the other half of said diffraction orders a transmission −1 for providing a phase-reversing filter.

5. A correlator as claimed in claim 4, said auxiliary filter means being positioned forwardly of said hologram filter.

6. A correlator as claimed in claim 4, said auxiliary filter means being positioned rearwardly of said hologram filter.

* * * * *